United States Patent
Kurokawa et al.

(10) Patent No.: US 7,619,789 B2
(45) Date of Patent: Nov. 17, 2009

(54) IMAGE READING APPARATUS

(75) Inventors: Naho Kurokawa, Inagi (JP); Tsuyoshi Yamauchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 11/318,199

(22) Filed: Dec. 23, 2005

(65) Prior Publication Data

US 2006/0139703 A1   Jun. 29, 2006

(30) Foreign Application Priority Data

Dec. 28, 2004   (JP)   .............................. 2004-379299

(51) Int. Cl.
H04N 1/04        (2006.01)
G03G 15/00       (2006.01)

(52) U.S. Cl. .................. 358/497; 358/474; 358/471; 399/380; 399/379

(58) Field of Classification Search ................ 358/497, 358/474, 471, 400, 500, 501, 505; 399/380, 399/379, 367, 211, 212; 355/75; 16/374, 16/239, 266, 319, 333
See application file for complete search history.

(56) References Cited

U.S. PATENT DOCUMENTS

| 4,172,660 | A  | * | 10/1979 | Yanofsky et al. ............... 355/75 |
| 4,588,290 | A  | * | 5/1986  | Ohtsuka ....................... 355/76 |
| 5,507,013 | A  | * | 4/1996  | Weadon et al. ............ 455/575.3 |
| 6,233,064 | B1 |   | 5/2001  | Griffin |
| 6,363,576 | B1 | * | 4/2002  | Hsu et al. ...................... 16/239 |
| 6,785,025 | B1 |   | 8/2004  | Dawe et al. |
| 7,136,201 | B2 | * | 11/2006 | Kawasaki et al. ........... 358/474 |
| 7,225,506 | B2 | * | 6/2007  | Toap ............................ 16/374 |
| 2003/0049061 | A1 |   | 3/2003  | Hata et al. |
| 2006/0139701 | A1 | * | 6/2006  | Kurokawa et al. .......... 358/474 |

(Continued)

FOREIGN PATENT DOCUMENTS

EP   0 762 722 A2   3/1997

(Continued)

OTHER PUBLICATIONS

Relevant portion of European Search Report of corresonding European Application EP 05028516.2-2202.

(Continued)

Primary Examiner—Cheukfan Lee
(74) Attorney, Agent, or Firm—Rossi, Kimms & McDowell, LLP

(57) ABSTRACT

To provide a technology which facilitates an operation for placing a document with a larger size than a size of a document table, on the document table. A document cover is positioned at a plurality of open positions to a document table. A pivot of a document table 2 and a hinge 7 is configured by two pivots A1, A2, and a constricted portion 1b and it is configured in such a manner that, in case of setting a document with a smaller size than that of the document table 2, the pivot A2 is pivoted at a convex portion 7a of the hinge 7, and in case of setting a document with a larger size than that of the document table 2, the convex portion 7a is moved to the pivot A1 side through the constricted portion 1b, and the pivot A1 is pivoted at the convex portion 7a.

6 Claims, 23 Drawing Sheets

U.S. PATENT DOCUMENTS

| | | | |
|---|---|---|---|
| 2007/0199178 A1* | 8/2007 | Katsumata | 16/286 |
| 2008/0024750 A1* | 1/2008 | Nogami | 355/75 |

FOREIGN PATENT DOCUMENTS

| JP | 56-006259 A | 1/1981 |
|---|---|---|
| JP | 63-033740 A | 2/1988 |
| JP | 01-221978 A | 9/1989 |
| JP | 1-34183 A | 10/1989 |
| JP | 1-34183 Y2 | 10/1989 |
| JP | 2-302168 A | 12/1990 |
| JP | 02-302168 A | 12/1990 |
| JP | 04-037361 U | 3/1992 |
| JP | 04-239452 A | 8/1992 |
| JP | 09-106014 A | 4/1997 |
| JP | 9-179218 A | 7/1997 |
| JP | 09-244159 A | 9/1997 |
| JP | 10-197971 A | 7/1998 |
| JP | 2002-014432 A | 1/2002 |
| JP | 2004-258149 | 9/2004 |

OTHER PUBLICATIONS

Full English translation of Japanese Utility Model Laid-Open Publication No. 4-37361 (previously cited and considered).

* cited by examiner

F I G. 2
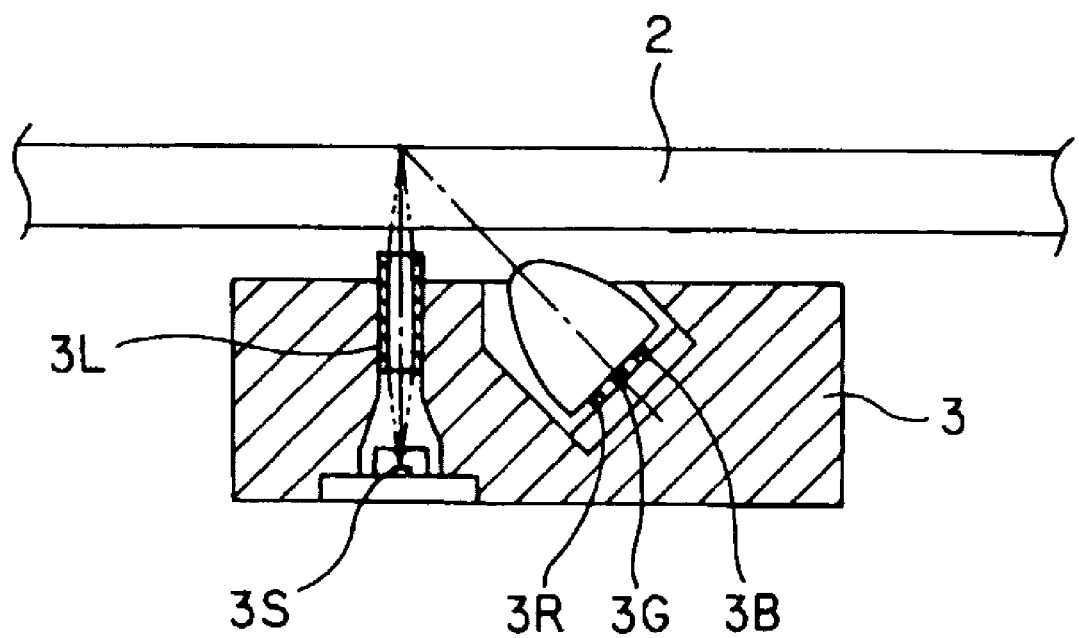

F I G. 9
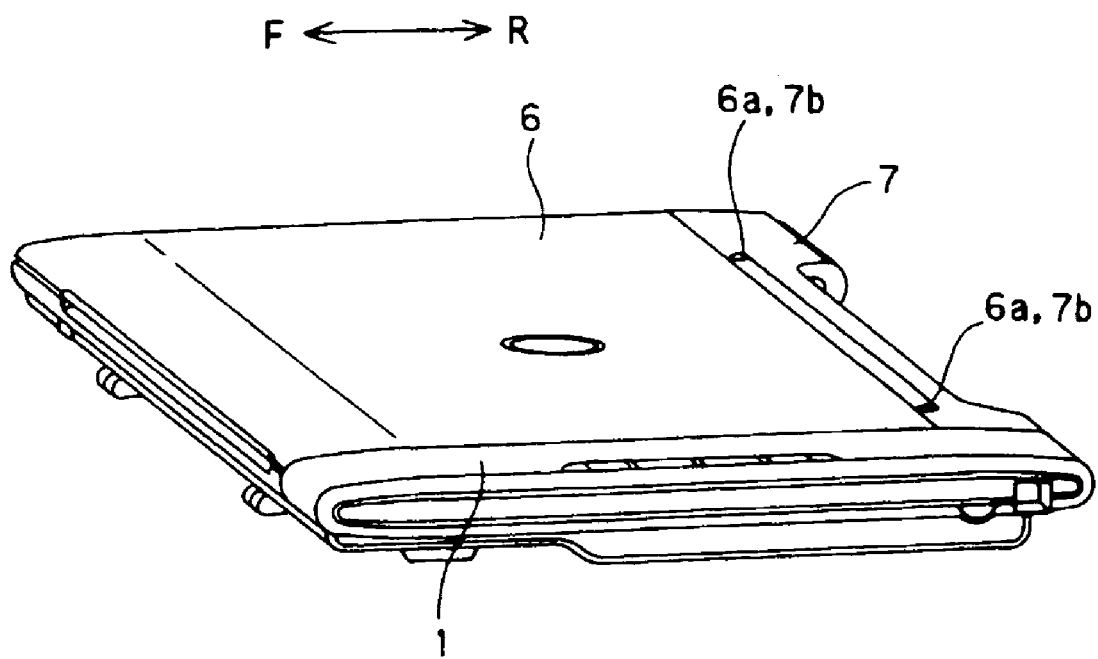

IMAGE READING APPARATUS

BACKGROUND OF THE INVENTION

1. Field of the Invention

This invention relates to an image reading apparatus which reads out image information of a document which was placed on a document table.

2. Related Background Art

Conventionally, in this kind of image reading apparatus, a cover member for pressing a document which was placed on a document table is disposed, in an openable manner, to an apparatus main body In an image reading apparatus which was described in Japanese utility model publication: JP-UM-B-1-34183, in such a condition that the cover member was opened nearly vertically, it is held by an anti-falling member.

In the meantime, a cover member, which was described in JP-UM-B 1-34183 publication, has only one open position to the apparatus main body, and therefore, in case of trying to set a document with a larger size than the document table, the cover member in the open position becomes an obstacle, and it was difficult to set,the document on the document table.

The invention was made in view of the above-described circumstances, and aims to provide a technology which facilitates an operation for placing a document with a larger size than a size of the document table, on the document table, and by which operability was improved.

SUMMARY OF THE INVENTION

To achieve the above-described object, an image reading apparatus according to the present invention is constituted as follows.

An image reading apparatus for reading out an image of a document has a document table on which the document is placed, a cover member which is disposed, in an openable manner, to a main body of the image reading apparatus and presses the document which was placed on the document table, and a hinge which supports the cover member in openable and closable manners, to the document table of the image reading apparatus, wherein, the hinge has a cover opening limit angle adjustment mechanism which can set up a plurality of upper limits of an opening angle of the cover member to the document table.

BRIEF DESCRIPTION OF THE DRAWINGS

The invention, together with further advantages thereof, may best be understood by reference to the following description taken in conjunction with the accompanying drawings in which:

FIG. 2 is a schematic cross-sectional view of a contact image sensor in the embodiment of the invention;

FIG. 9 is a view for explaining the condition that the document cover is closed in the image reading apparatus which relates to the embodiment of the invention;

DETAILED DESCRIPTION OF THE EMBODIMENT

Hereinafter, with reference to the drawings, a best mode for carrying out this invention will be described in detail in an exemplification manner. In this regard, however, dimensions, materials, shapes of constituent components which are described in this embodiment, a relative configuration of them and so on should be changed arbitrarily depending on a configuration and various conditions of an apparatus to which the invention is applied, and they do not mean to limit a scope of the invention to the following embodiments.

(Overall Configuration)

Figure 1:
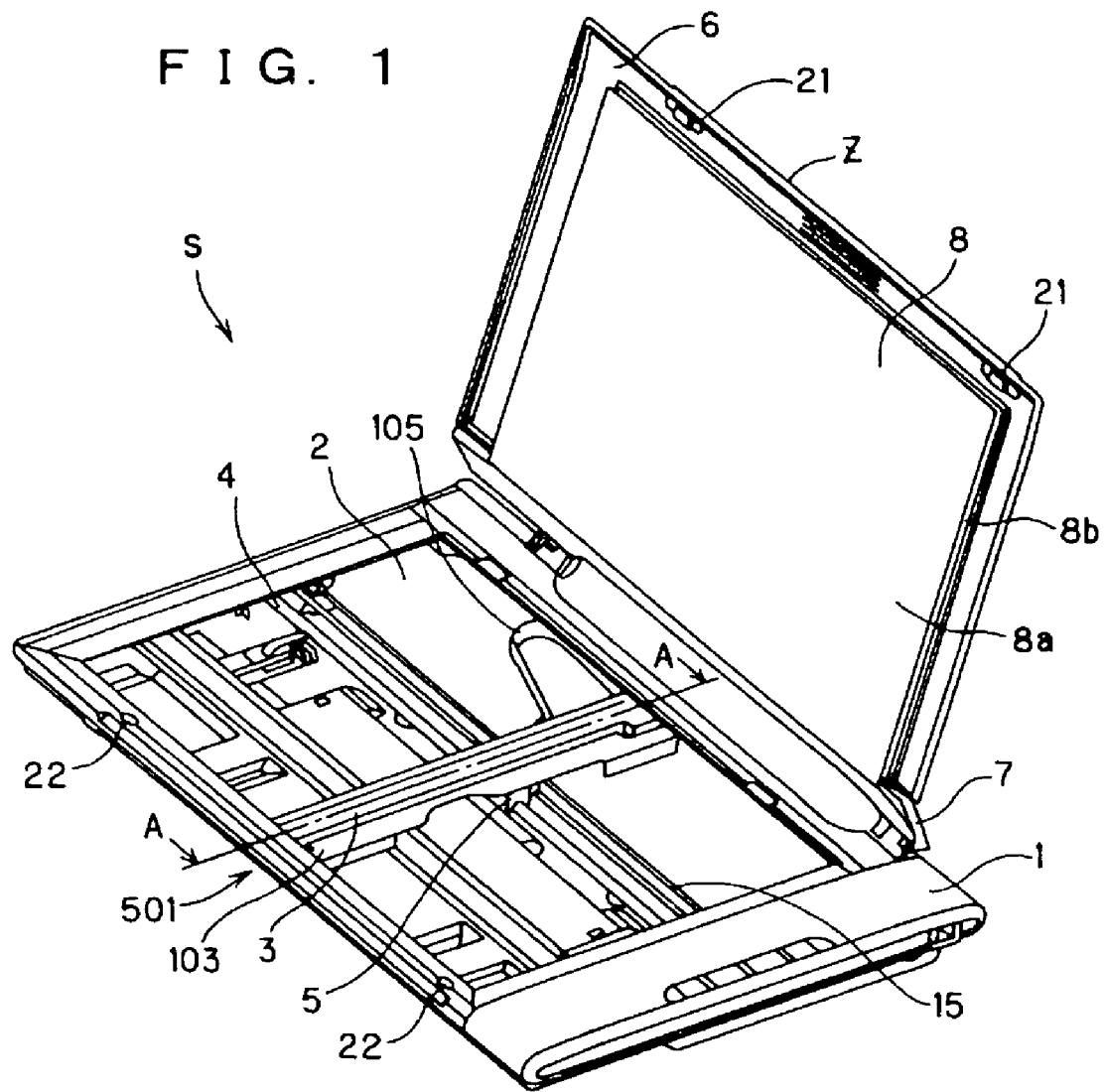
FIG. 1 is a pattern view for explaining a configuration of an image reading apparatus which relates to an embodiment of the invention.

FIG. 1 is a pattern view for explaining a configuration of an image reading apparatus which relates to an embodiment of the invention.

As shown in FIG. 1, an image reading apparatus S reads out an image of a document which is set (placed) on a document table glass (document table) attached to its upper surface, by having a contact image sensor 3 (hereinafter, referred to as CIS) as image reading means scan the image in parallel to the document table glass 2.

Figure 3:
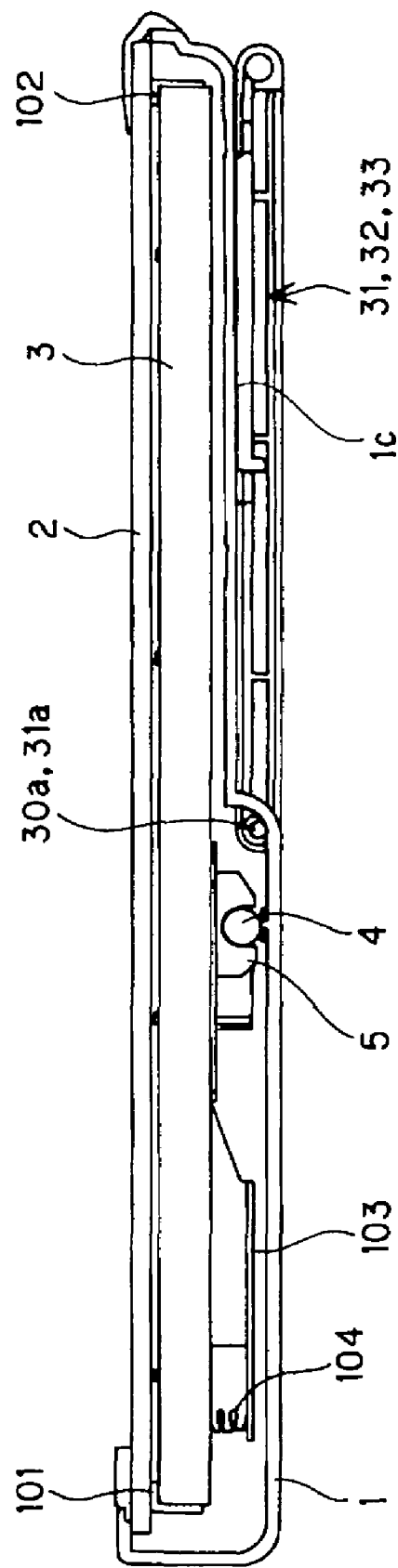
FIG. 3 is a view which shows an A-A cross-section of FIG.1.
Figure 4:
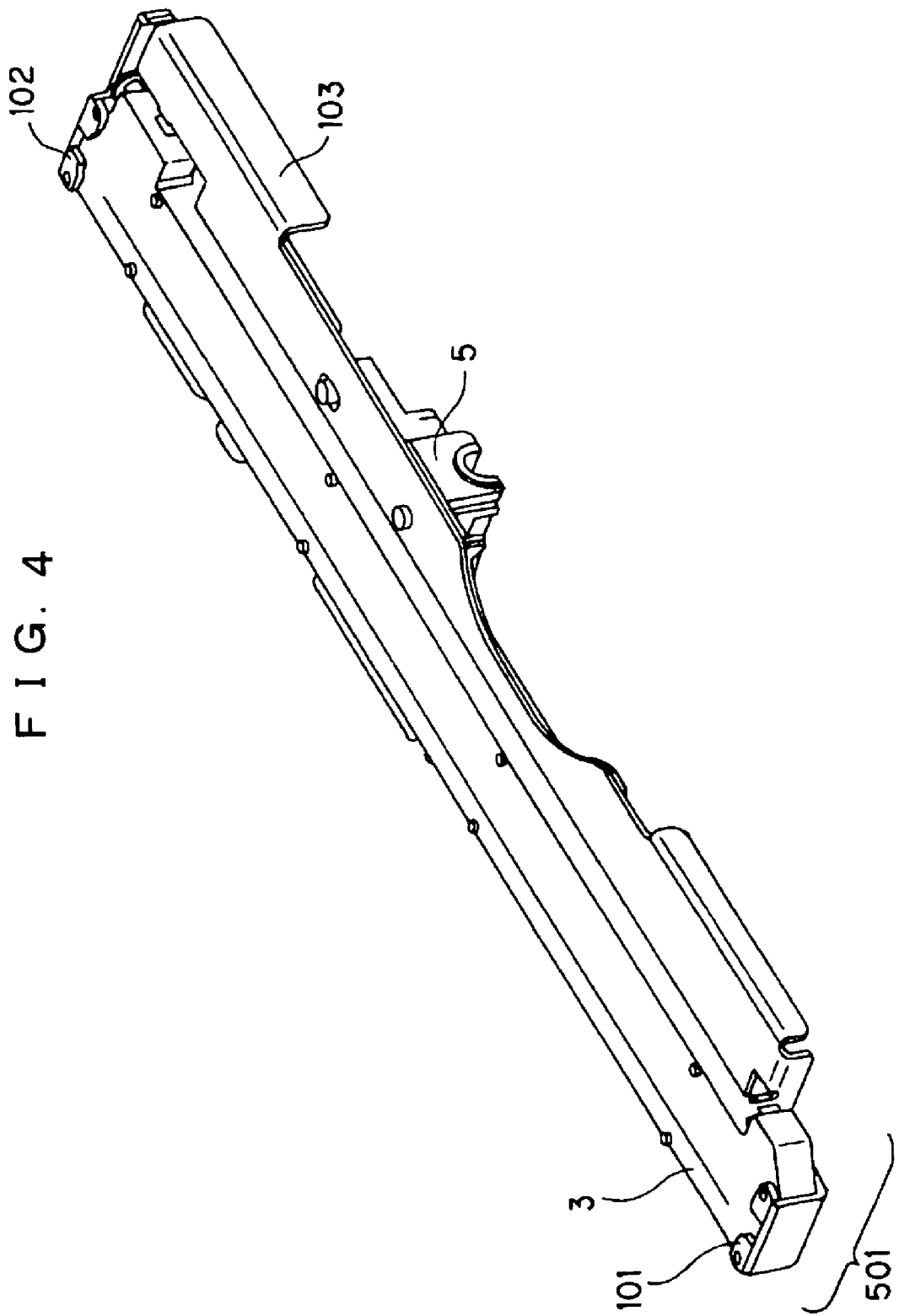
FIG. 4 is a schematic perspective view of a carriage unit in the embodiment of the invention.

FIG. 2 is a schematic cross-sectional view of CIS 3 in this embodiment. FIG. 3 is a view which shows an A-A cross-section in FIG. 1. FIG. 4 is a schematic perspective view of a carriage unit on which the contact image sensor 3 is disposed.

As to CIS 3, as shown in FIG. 2, into its inside, three color LEDs 3R, 3G, 3B which are light sources for document irradiation, a rod lens array 3L for providing an image of reflected light from a document on a light-sensitive element of CIS 3 and an image sensor 3S are incorporated.

The three color light sources are changed over sequentially to be lighted up, and the image sensor 3S reads out reflected light from a document with respect to each color, and thereby, color separation reading is carried out.

The above-described CIS 3 is supported by a sensor holder 103, and as shown in FIG. 3, it is contacted with pressure to the document table glass 2, through spacers 101, 102 which are made of a material with a good sliding performance, by a spring 104 which is positioned on the sensor holder 103.

The sensor holder 103 is fixed and supported on a slider 5 which slides on a guide shaft 4 fixed to an apparatus main body 1, as shown in. FIG. 1.

Here, a unit integrated with the slider 5, such as CIS 3, the sensor holder 103, the spring 104, and the slider 5 shown in FIG. 4, is hereinafter called as a carriage 501.

In addition, to the slider 5, a belt 15 for conveying a motive force from a motor which is a scanning drive source is fixed. By forward and backward rotations of the motor, the carriage 501 is configured so as to be able to carry out reciprocating scanning within a range of the document table glass 2.

In addition, one side of a flexible cable 105 for electric input and output of the sensor 3 is connected to the sensor 3, and the other side of the same is connected to a control board. (not shown in the figure) of the image reading apparatus main body.

As shown in FIG. 3, as to the apparatus main body 1, a right side of the position that the slider 5 scans in the figure is configured so as to be thin up to a position separated from the sensor by a clearance portion, and at that position, a support structure (31 through 33) is pivotally mounted at 30a.

That is, as to a thickness direction of internal components of the apparatus main body on the side that the support structure is disposed, a total of the sensor and a component which is attached firmly to it is a maximum thickness, and among other necessary components, only those, which are accommodated within its height, are disposed in parallel. A thickness of the apparatus main body 1 at this portion is only (document table glass+close coupling type sensor+component attached firmly to the sensor+clearance gap +frame body).

Detail of the support structure will be described later.

In addition, to the slider 5, the belt 15 for conveying a motive force from the motor which is a scanning drive source is fixed. By forward and backward rotations of the motor, CIS 3 is configured so as to be able to carry out reciprocating scanning within a range of the document table glass 2.

Among constituent elements of the image reading apparatus, there is an electric section which is composed of a control board and a power source, in addition to the above-described elements. These constituent elements are disposed in the apparatus main body 1 which fixes and supports the document table glass.

In addition, on the document table glass 2, a document cover 6 as a pressing member for pressing a document to the document table glass 2 is attached, in openable and closable manners, to the apparatus main body 1 through a hinge 7 as a hinge member.

In addition, to an inner surface of the document cover 6 as a surface facing to the document table glass 2, a document pressing-contacting sheet 8 as a pressing-contacting member which is composed of a sheet member 8a and an elastic member 8b is pasted. Here, the document cover 6 and the hinge 7 configure a cover member.

Figure 5:
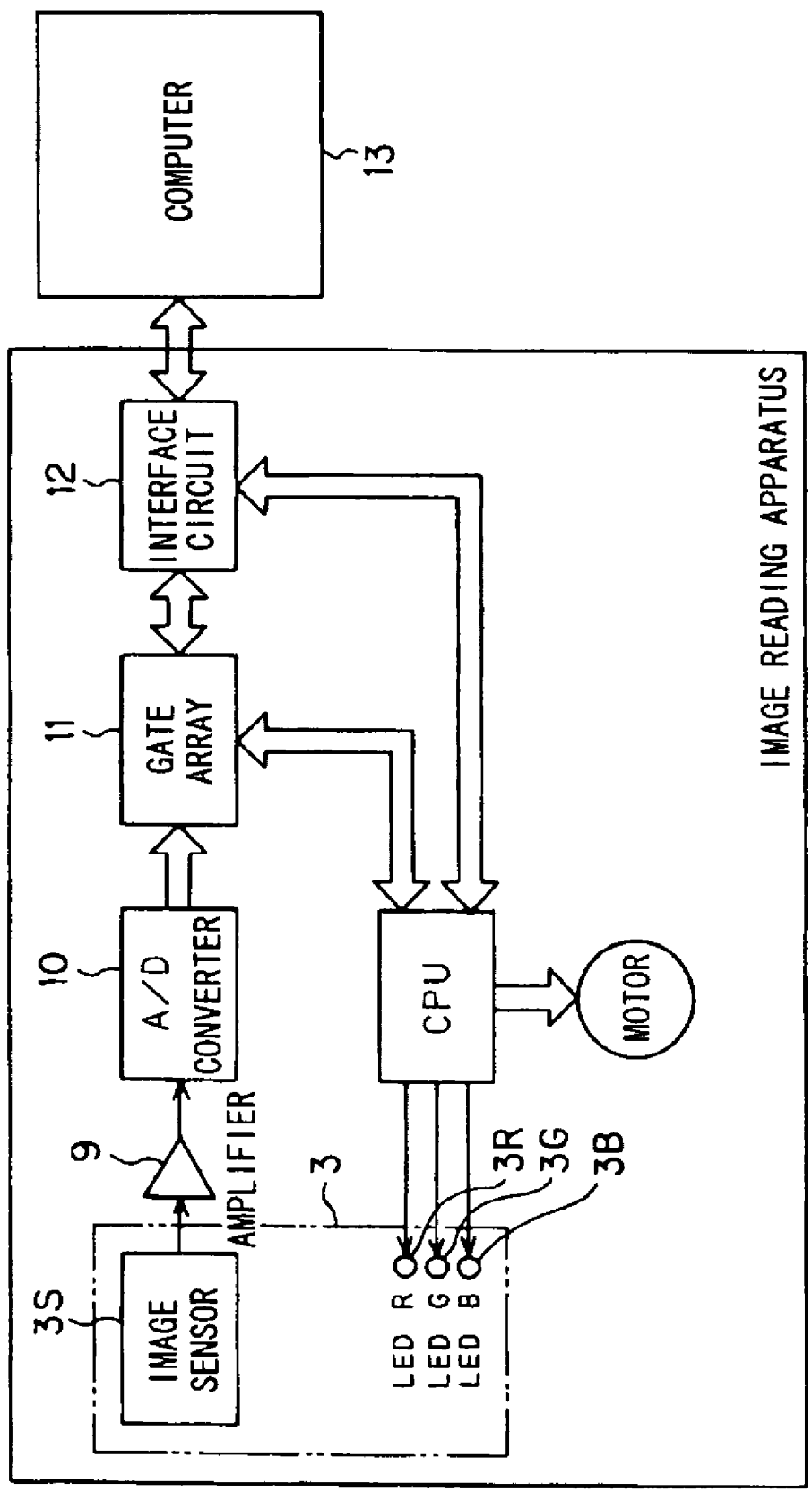
FIG. 5 is a read image data processing block according to the image reading apparatus which relates to the embodiment of the invention.

FIG. 5 is a read image data processing block diagram according to the image reading apparatus.

An image output signal, which was read out by the image sensor 3 in synchronization with LEDs which turn on and off sequentially, is sent to an amplifier 9 and amplified there, and after that, converted into a digital image signal by an A/D converter 10. The A/D converter 10 divides a dynamic range (a read output difference between a stark white portion and an intense black portion on a document) of the image sensor 3S into portions of its bit number, and allocates a tone number depending on brightness of an image on a document. For example, in case that an A/D converter with 8 bit resolution is used, it is possible to discriminate the brightness of an image ranging from white to black by 256 tone levels, and in case of a 10 bit A/D converter, it is possible to discriminate it by 1024 tone levels. Therefore, in case of color reading due to RGB three color light sources in the image reading apparatus using an 8 bit A/D converter, it is possible to discriminate 24 bit=approximately 16.70 million colors, and in case of 10 bit, it is possible to discriminate 30 bit=approximately 1074 million colors.

There are several kinds of output forms of image signals of an image reading apparatus, and depending on a usage of an image which was read out, it is possible to select an output form which is suitable for it. In case that a text is read out and its content is applied to OCR (optical character reader), and in case of reading out monochrome line drawings, a monochrome binary image is suitable. In this case, used is image data which was converted from an image signal which was obtained by lighting, for example, only G, among the above-described RGB light sources, into binary codes at a certain threshold value by an image processing circuit incorporated into a gate array 11.

In case of reading out an image for the purpose of reading out an image such as a photograph and outputting it to a monochrome printer, used is image data which was converted into binary codes by using halftone processing such as a dither method and an error diffusion method, through the use of an image signal due to the G light source likewise.

In case of carrying out processing of a color image, a multi-valued (24 bit etc.) image data is suitable.

The above-described image signal, which passed through the image processing circuit, is outputted to a device such as a personal computer 13 through an interface circuit 12.

(Document Cover/Hinge Configuration)

Next, an opening/closing configuration of the document cover 6 to the apparatus main body 1 will be described.

Figure 6:
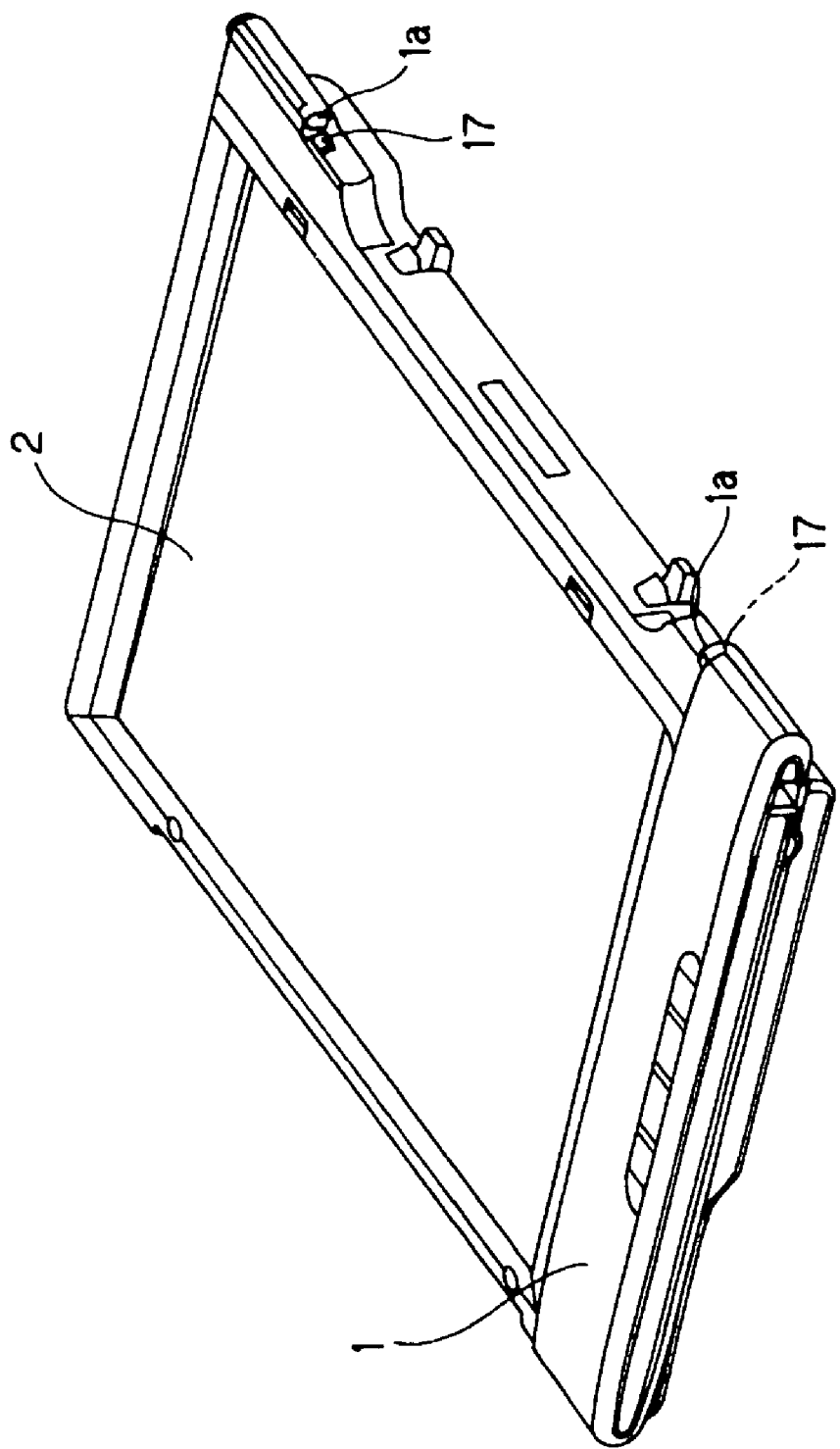
FIGS. 6 through 8 are views for explaining a configuration of a hinge which couples a document cover in openable and closable manners, in the image reading apparatus which relates to the embodiment of the invention.
Figure 7:
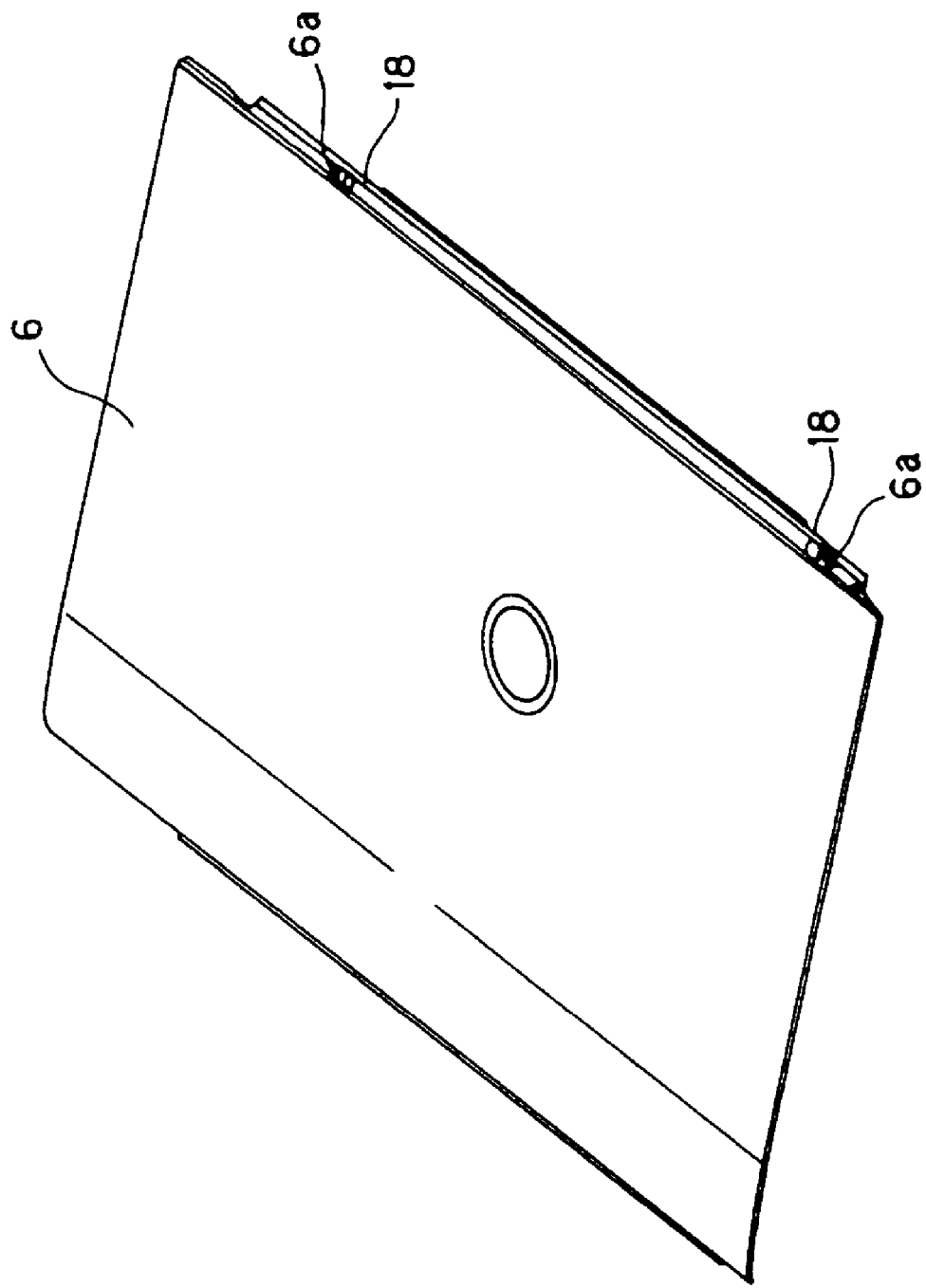
Figure 8:
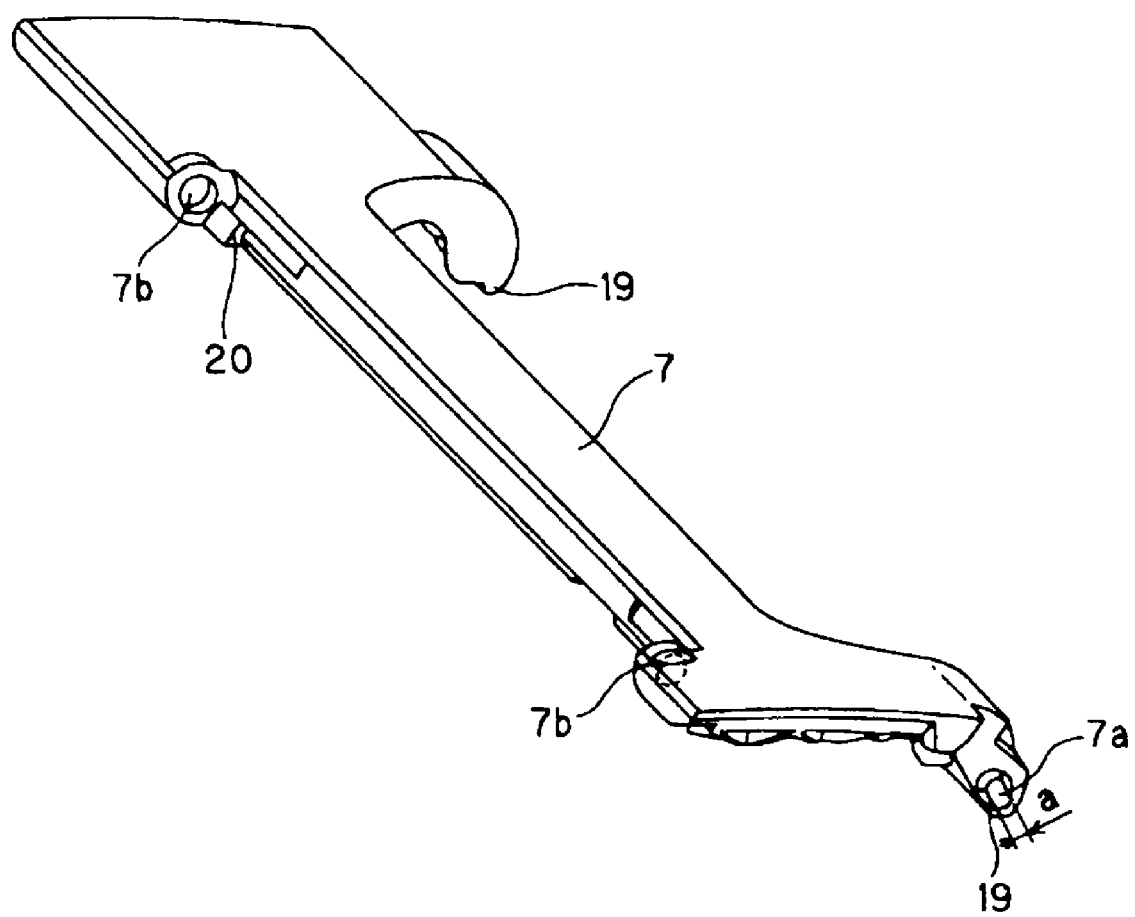

FIGS. 6 through 8 are views for explaining a configuration of a hinge which couples the apparatus main body 1 and the document cover 6 in an openable and closable manner.

That is, FIG. 6 is a view which shows the apparatus main body 1 (the condition that the document cover 6 was removed from the image reading apparatus) in this embodiment, and FIG. 7 is a view which shows the document cover 6, and FIG. 8 is a view which shows the hinge 7.

Figure 10:
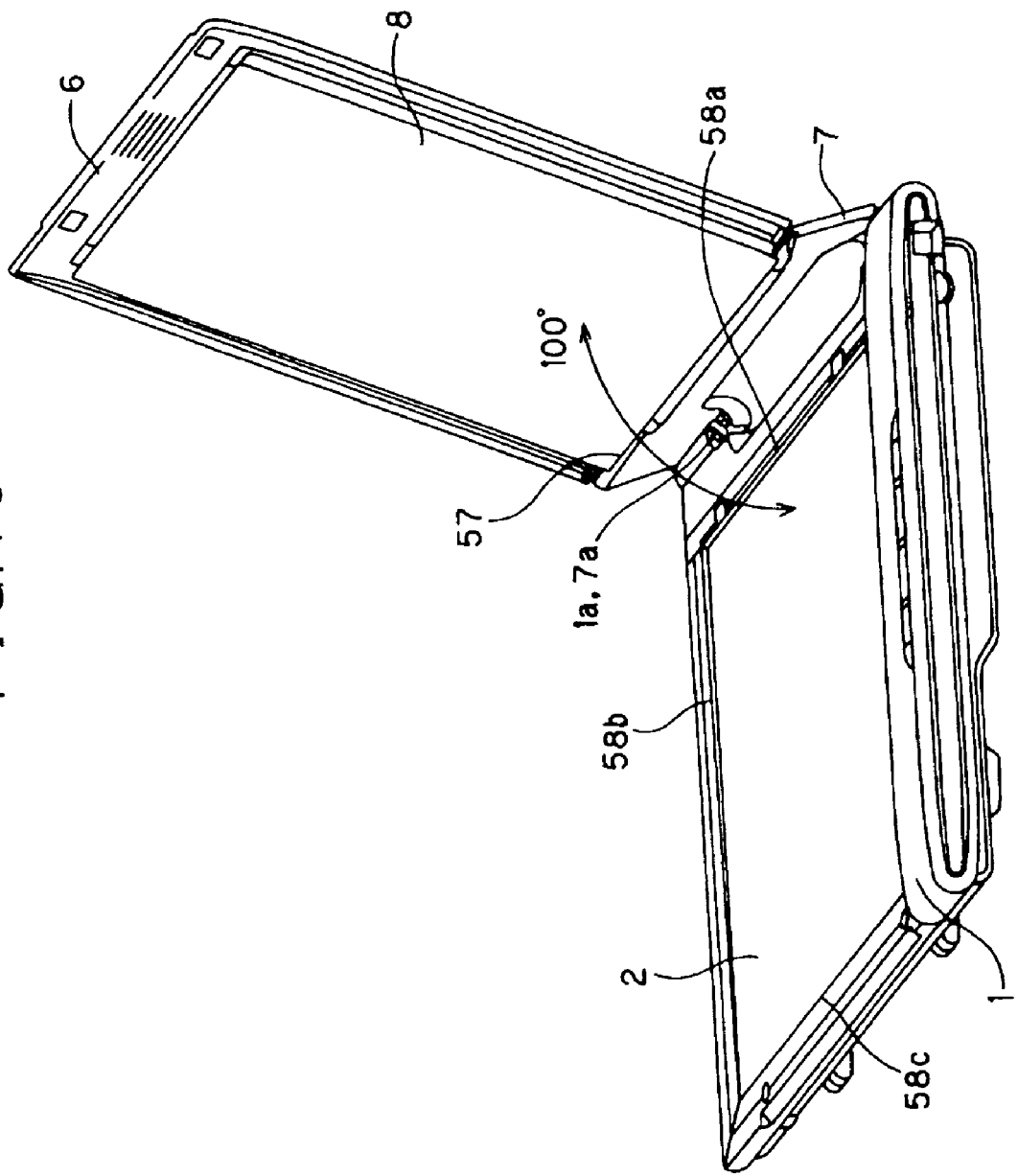
FIG. 10 is a view for explaining the condition that the document cover is opened by 100 degrees in the image reading apparatus which relates to the embodiment of the invention.

In addition, FIG. 9 is a view for explaining the condition that the document cover 6 was closed, and FIG. 10 is a view for explaining the condition that the document cover 6 was opened by nearly 100°.

Figure 11:
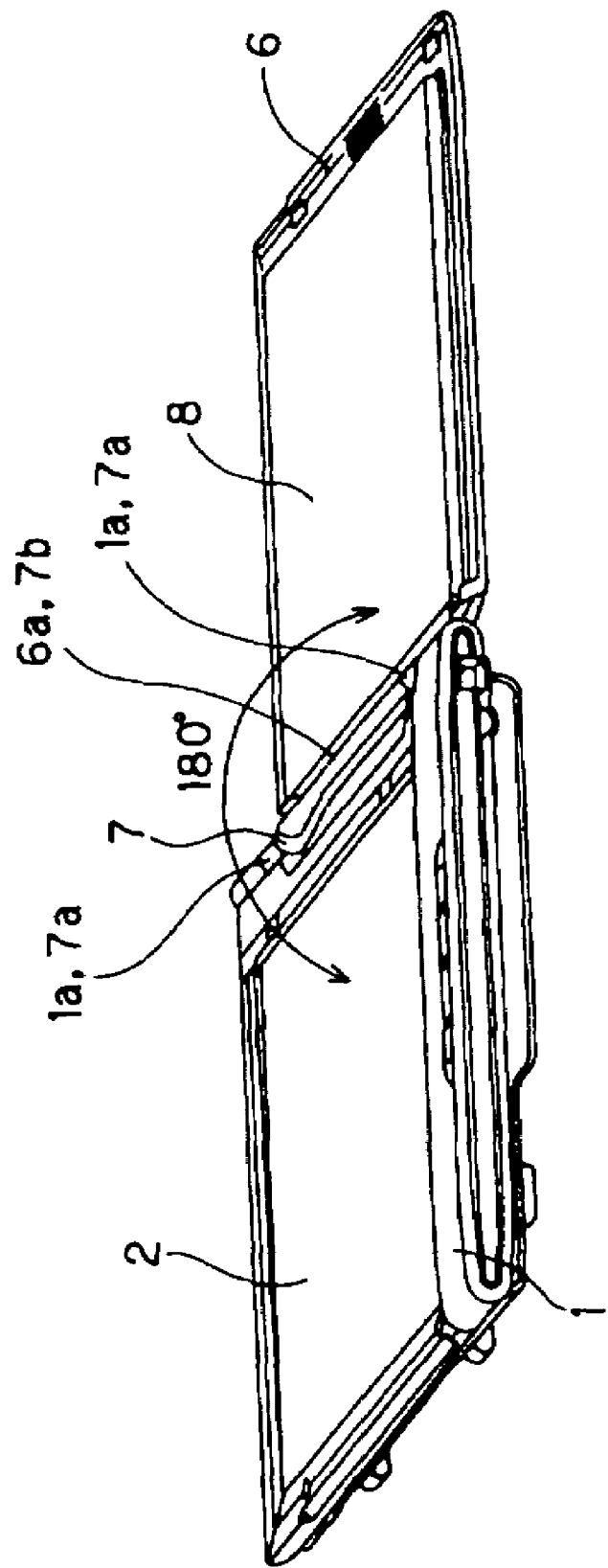
FIG. 11 is a view for explaining the condition that the document cover is opened by 180 degrees in the image reading apparatus which relates to the embodiment of the invention.
Figure 12:
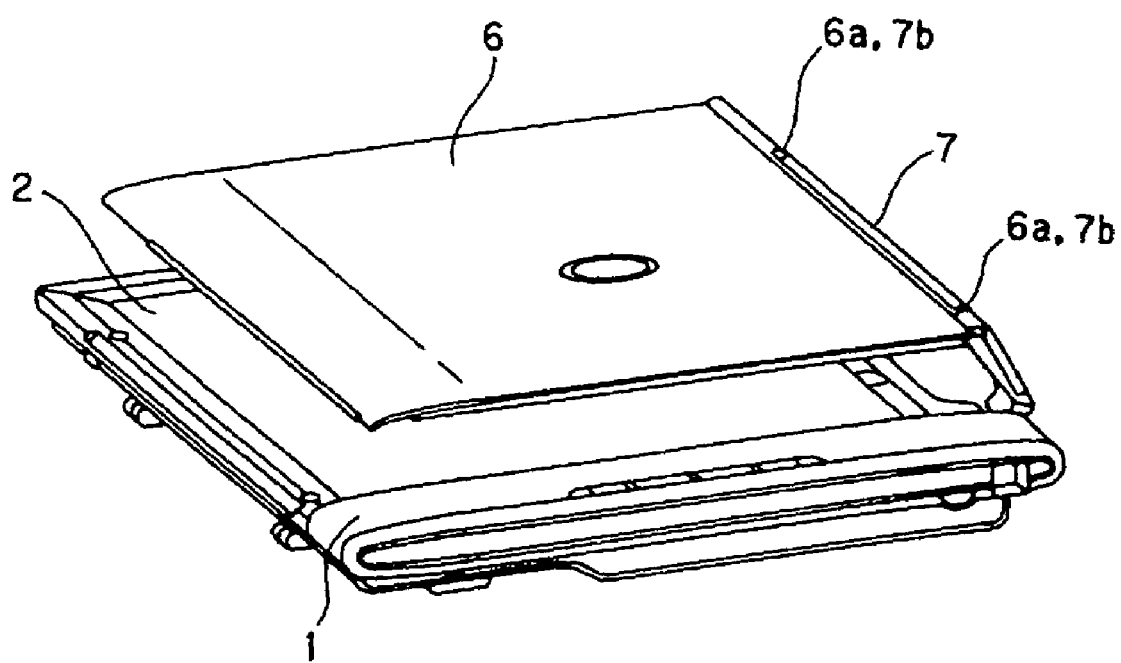
FIGS. 12 and 13 are views for explaining the condition that only the hinge was opened by 60 degrees in the image reading apparatus which relates to the embodiment of the invention.
Figure 13:
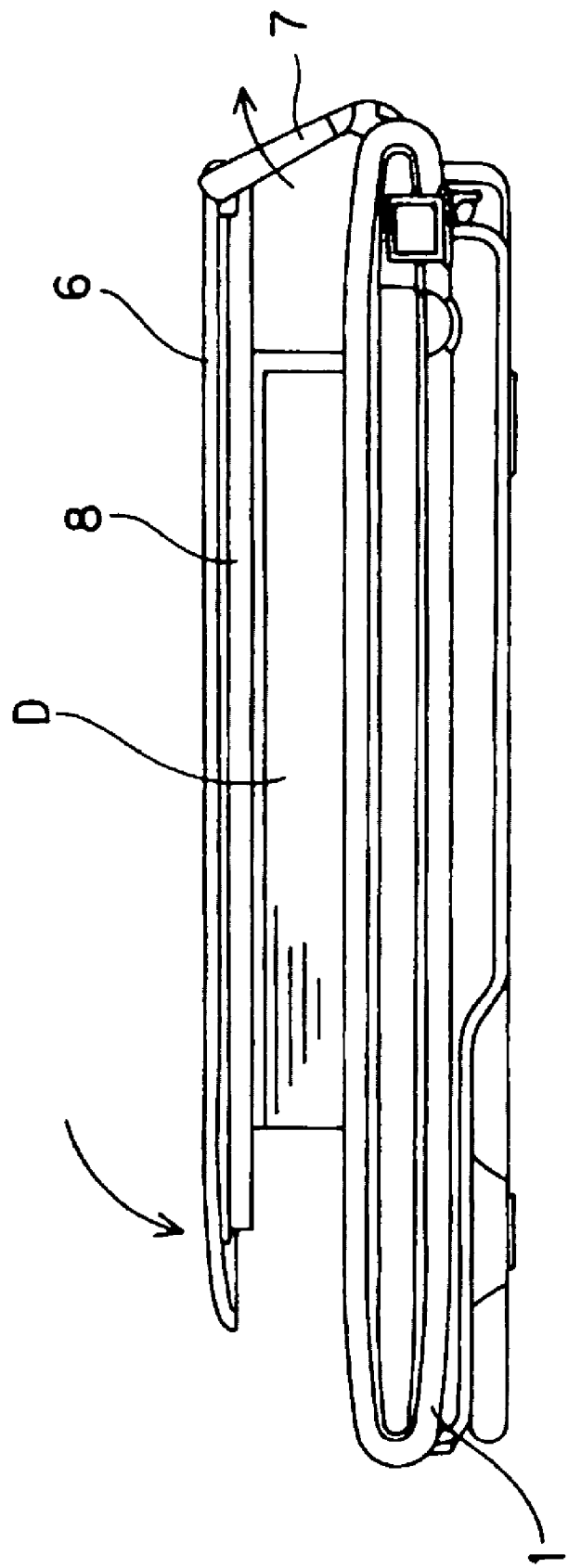

FIG. 11 is a view for explaining the condition that the document cover 6 is opened by nearly 180°, and FIGS. 12 and 13 are view of the condition that only the hinge 7 is opened by nearly 60° (the condition that the document cover 6 was moved nearly in parallel to the document table glass 2).

As shown in FIGS. 6 through 13, on the image reading apparatus, the document cover 6 for pressing a document P to the document table glass 2 and the hinge 7 for connecting the apparatus main body 1 and the document cover 6 are disposed, and thereby, the document cover 6 becomes openable and closable to the apparatus main body 1.

Here, between the apparatus main body 1 and the hinge 7, a fitting portion of a concave portion 1a which is disposed at a rear end portion of the apparatus main body 1 and a convex portion 7a which is disposed at a rear end portion of the hinge 7 becomes a supporting point (pivot, pivoting axis), and the hinge 7 becomes openable and closable to the apparatus main body 1.

Meanwhile, the concave portion 1a configures a bearing portion of a open position adjustment mechanism (a cover opening limit angle adjustment mechanism which can set up a plurality of upper limits of an opening angle of the document cover 6 to the document table glass 2) which relates to the invention, and the convex portion 7a configures a pivoting axis of the open position adjustment mechanism which relates to the invention.

In addition, between the hinge 7 and the document cover 6, a fitting portion of a concave portion (hereinafter, referred to as axis supporting portion) 7b which is disposed at a front end portion of the hinge 7 and a convex portion (hereinafter, referred to as axis supporting portion) 6a which is disposed at a rear end portion of the document cover 6 becomes a supporting point (pivot, pivoting axis), and they become pivotable relatively.

In this manner, between the apparatus main body 1, the hinge 7 and the document cover 6, two (two points) fitting portions are used as supporting points, and they are connected pivotally manner, and by this means, the document cover 6 becomes openable and closable to the apparatus main body 1.

Meanwhile, in this embodiment, a side, which configures a pivot with the hinge 7 in the apparatus main body 1, is assumed to be a rear side, and a side, which is in a nearly orthogonal direction to the pivoting axis in the apparatus main body 1 and is separated from the pivoting axis, is assumed to be a front side (an arrow F side shown in FIG. 9).

In the hinge 7 and the document cover 6, front and rear are defined under such a condition that they are closed to the apparatus main body 1.

Figure 14:
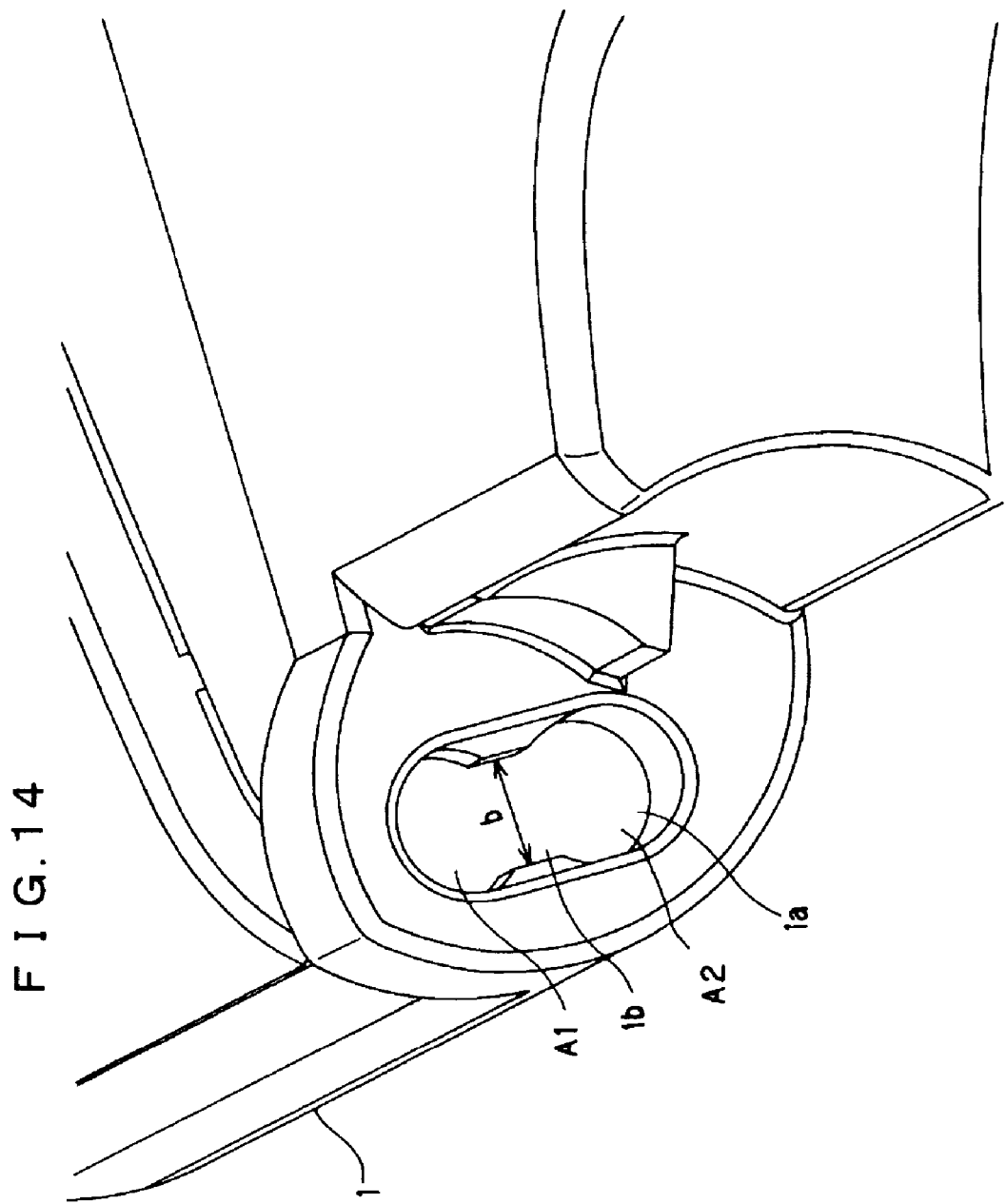
FIG. 14 is a view which shows a fitting portion with the hinge in an apparatus main body of the image reading apparatus which relates to the embodiment of the invention.

FIG. 14 is a view which shows a fitting portion with the hinge 7 in the apparatus main body 1.

Here, the concave portion 1a of the apparatus main body 1 is formed as a nearly gourd shape as shown in FIG. 14 in detail, and it has two pivots (pivot, pivoting portions) A1, A2 in up and down directions (nearly orthogonal direction to the document table glass 2) under a horizontally placed condition (the document table glass 2 is nearly horizontal).

In addition, as to the convex portion 7a at a rear end portion of the hinge 7, as shown in FIG. 8, its both end portions in a radial direction (in case of using the convex portion 7a as a pivoting axis, an orthogonal direction to the pivoting axis) at its front end portion of the convex portion are cut out in the form of a nearly plane, and a distance a of plane portions which are configured by these two planes is set up to be slightly smaller than a width b of the above-described nearly gourd shaped constricted portion 1b (a<b).

Here, in the convex portion 7a, the plane portion having cut both ends and the distance a configures a moving portion which relates to the invention, and a non-cut peripheral portion configures a pivoting portion relating to the invention, which pivots in the pivoting portions A1 and A2. In addition, the nearly gourd shaped constricted portion 1b communicates the two pivoting portions A1, A2, and configures a communicating path of a changeover mechanism which relates to the invention.

By this means, only when the hinge 7 was opened by a certain specific angle to the apparatus main body 1, the plane portion of the convex portion 7a passes through the above-described gourd shaped constricted portion 1b, and it can move between the pivoting portions A1 and A2, arbitrarily within a condition of an opening angle of the hinge 7.

When the opening angle of the hinge 7 to the apparatus main body 1 is an angle other than the above-described specific angle, the convex portion 7a is held pivotally at any one position of the pivoting portions A1, A2.

Hereinafter, three ways of opening the document cover 6 will be described.

Figure 19:
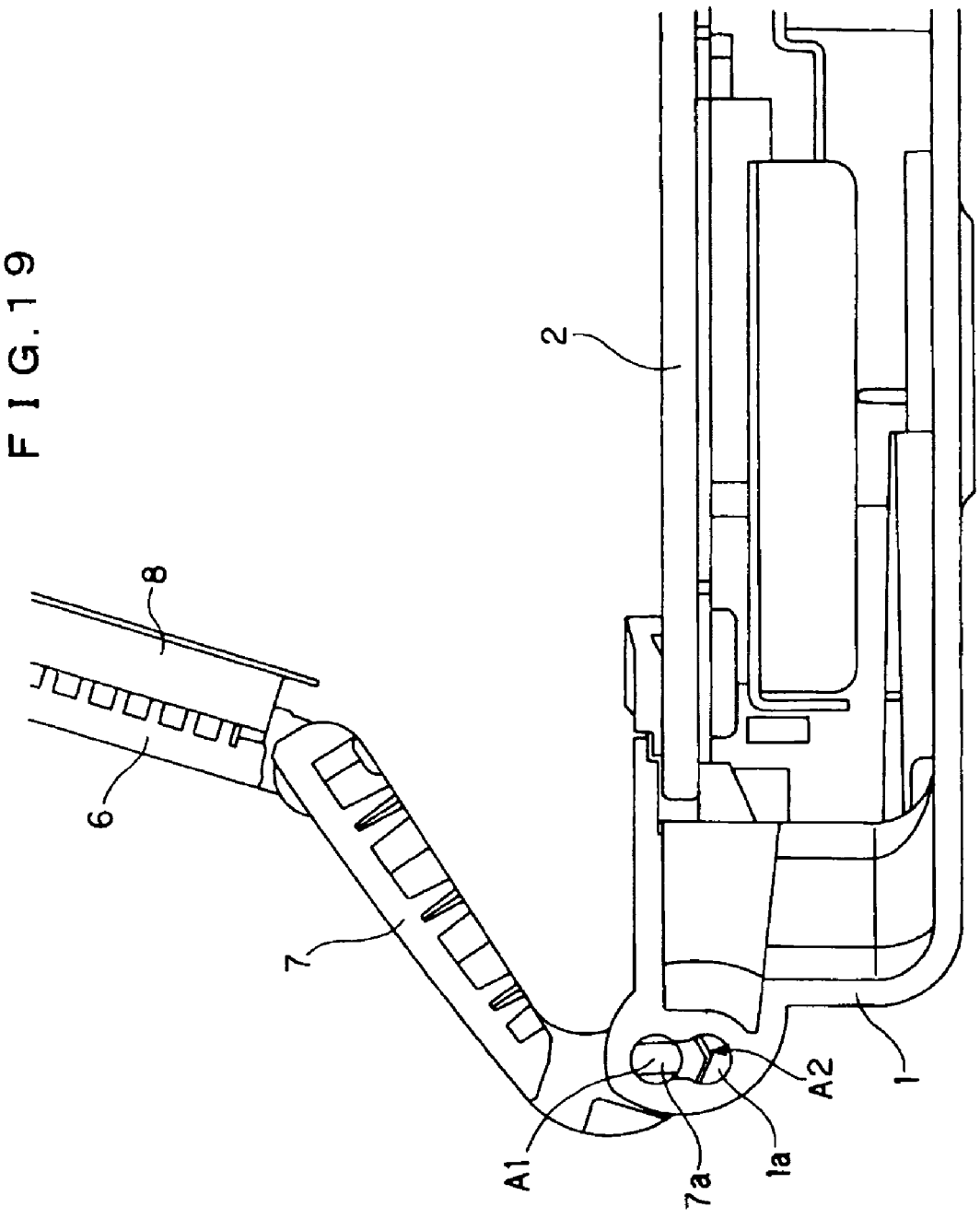
Figure 20:
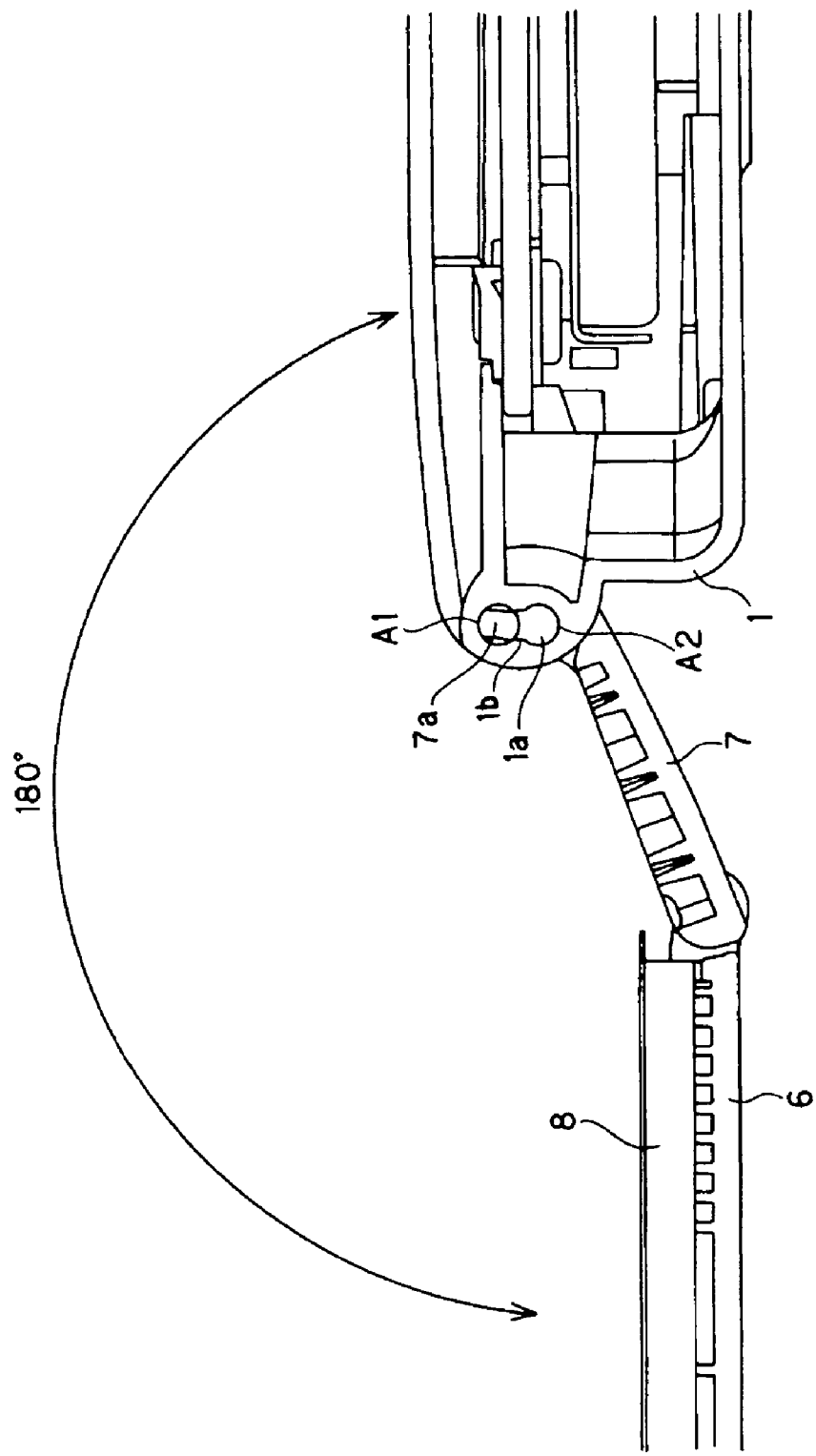
Figure 21:
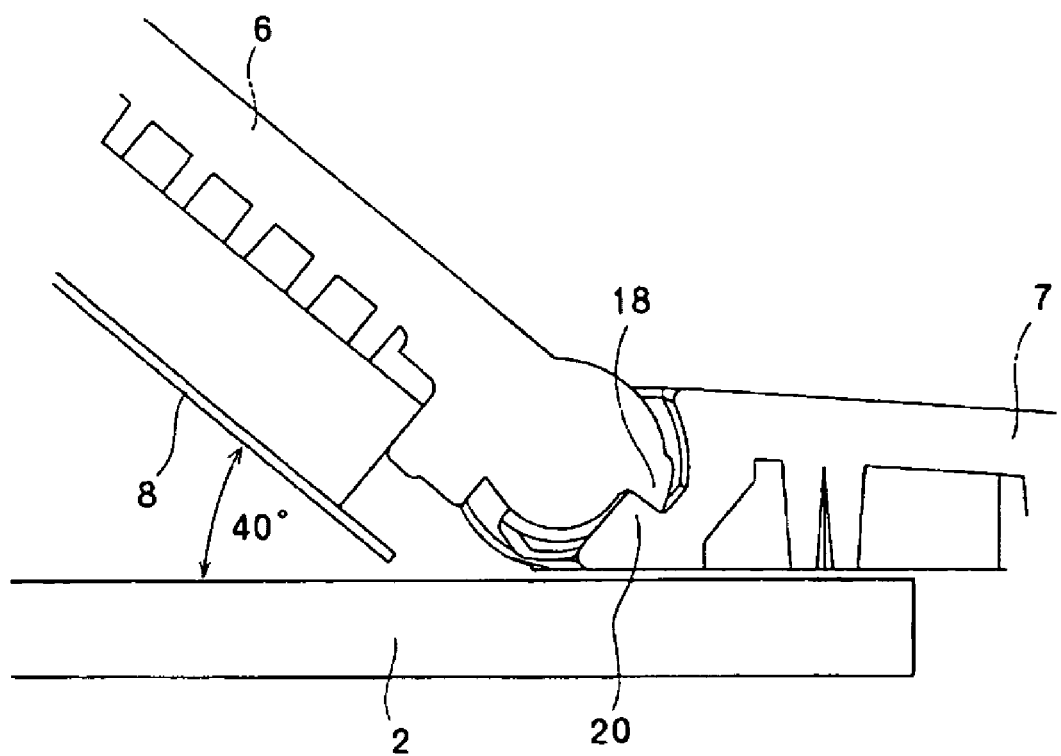
Figure 22:
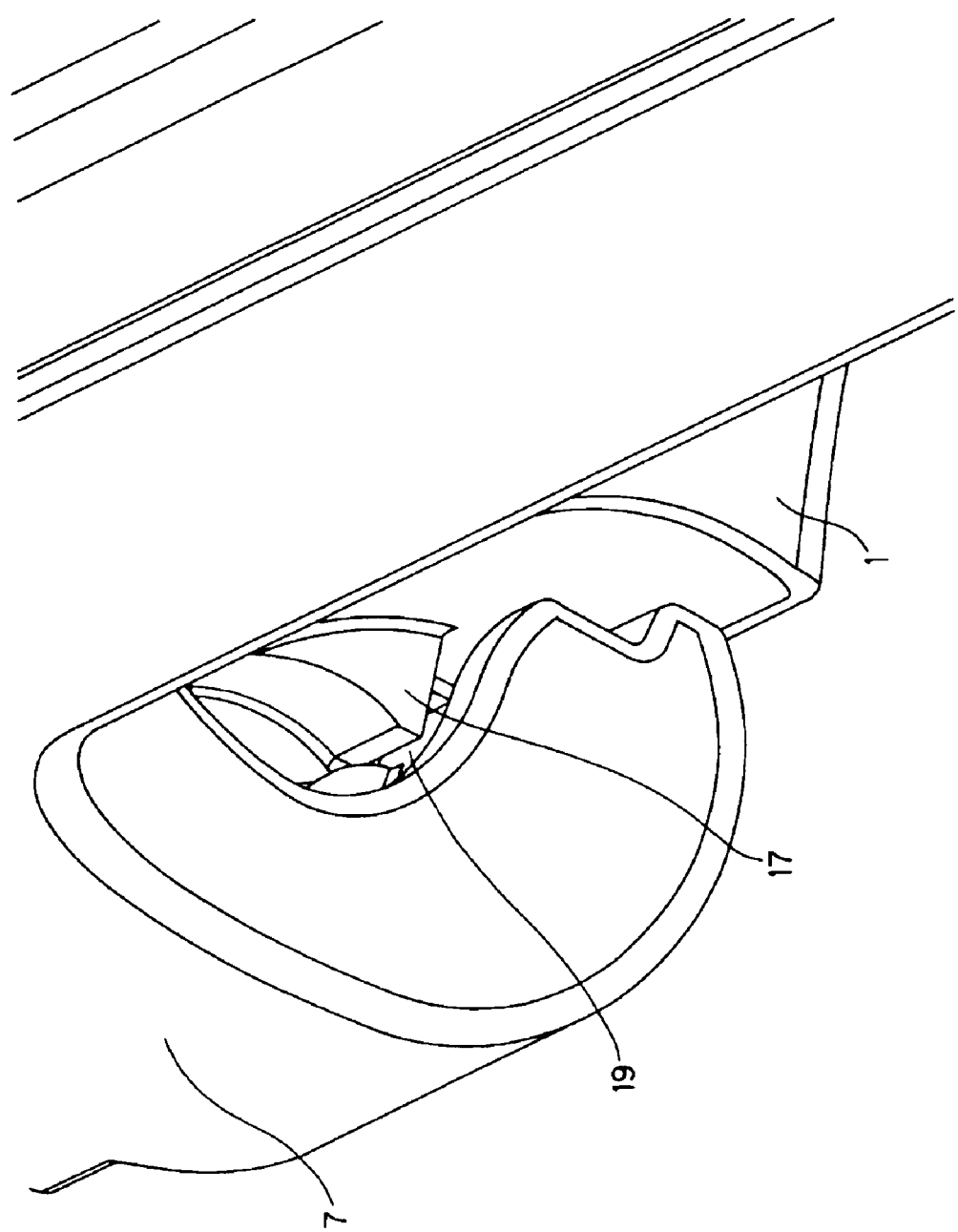
Figure 23:
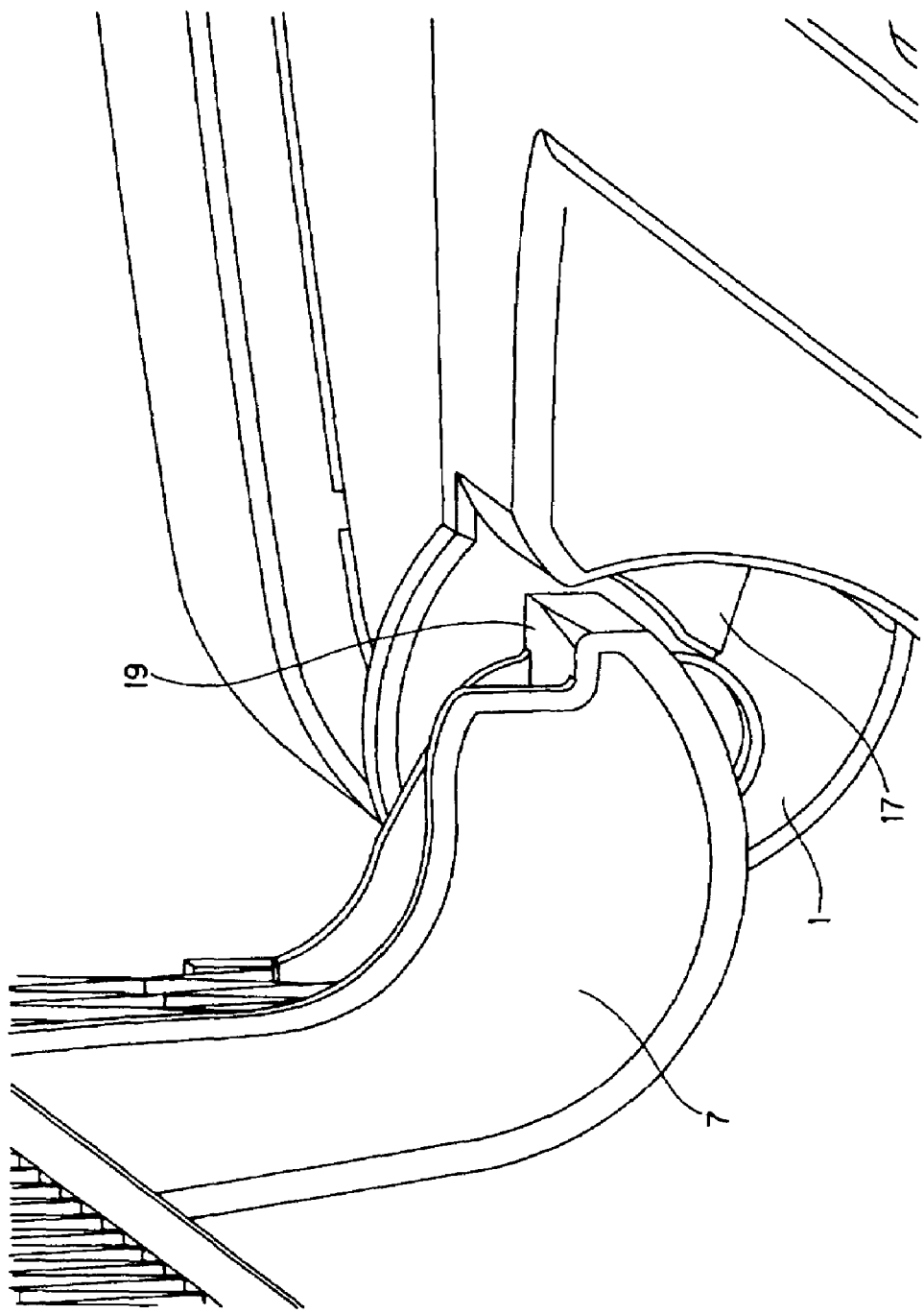

FIGS. 15 through 23 are views for explaining the condition that the document cover is opened in the image reading apparatus which relates to the embodiment of the invention, and especially in FIGS. 21 through 23, they are ones for explaining a restricted condition of a pivoting portion (fitting portion).

(Document Cover Open)

Figure 15:
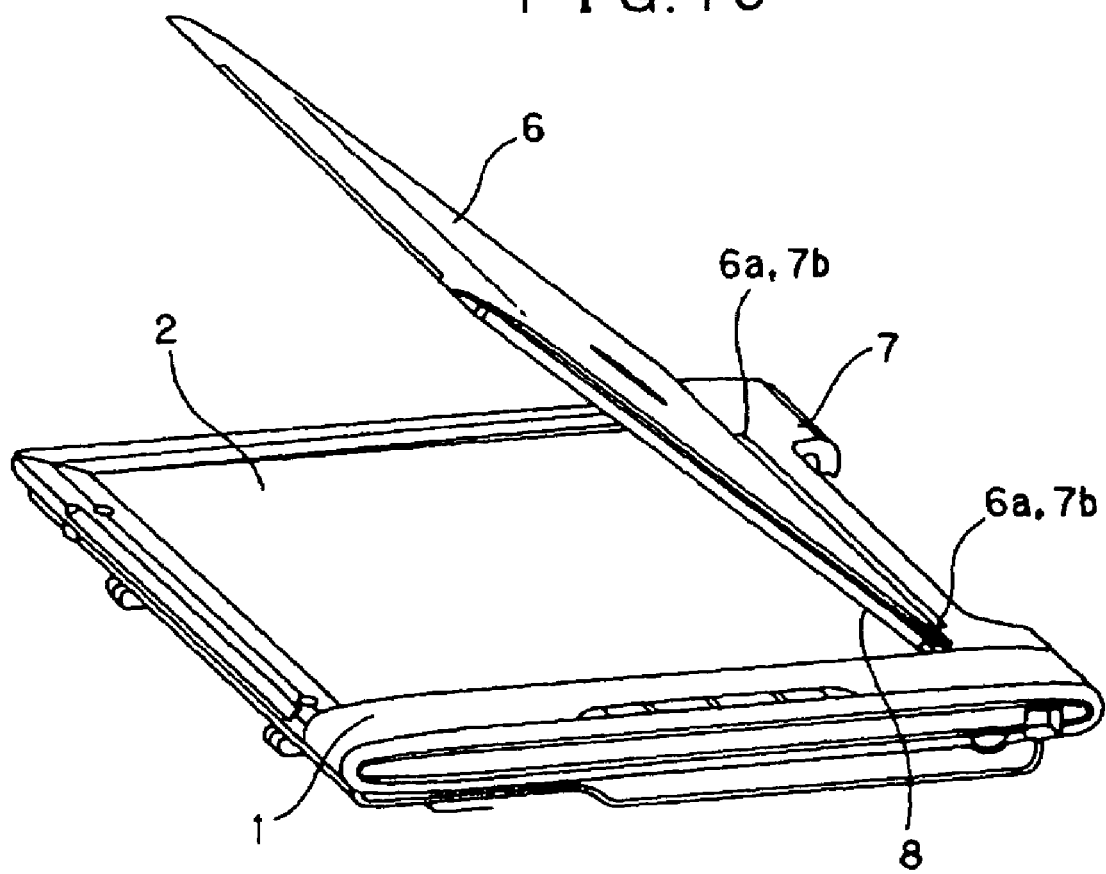
FIGS. 15 through 23 are views for explaining the condition that the document cover is opened in the image reading apparatus which relates to the embodiment of the invention.
Figure 17:
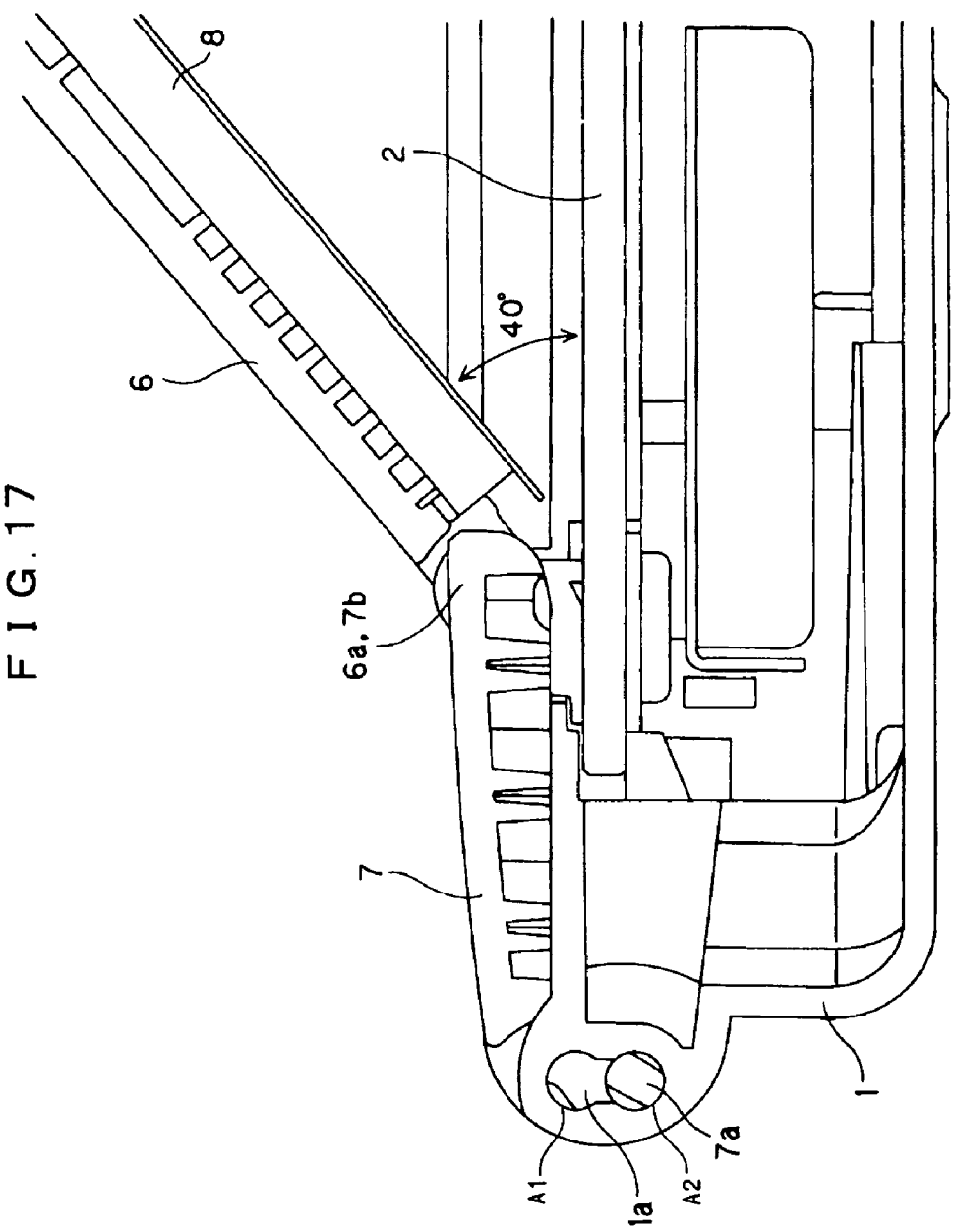
Figure 18:
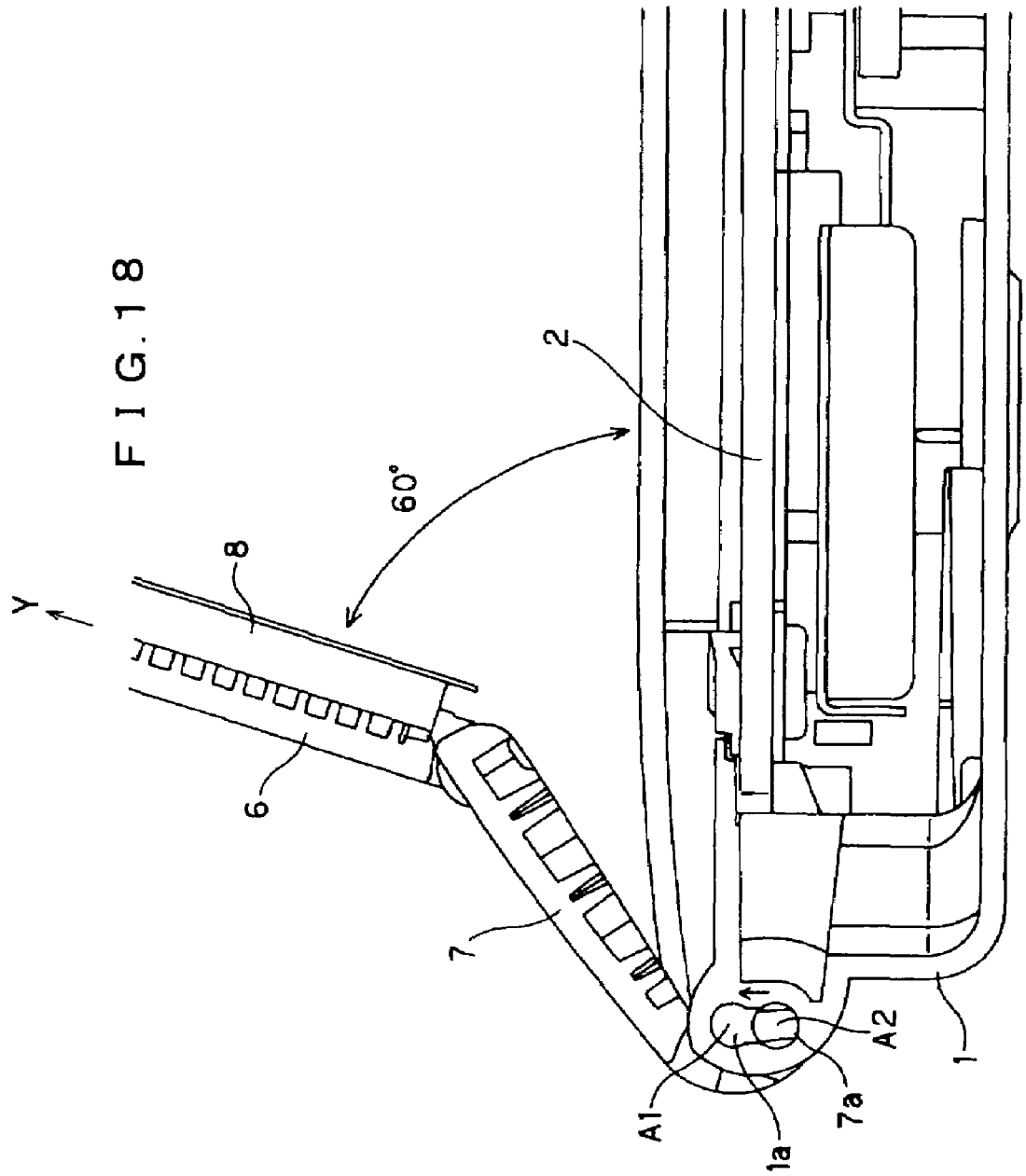

In case that the document cover 6 is opened by an operator (user) from the condition that the document cover 6 was closed, to the apparatus main body 1 as shown in FIG. 9, firstly, only the document cover 6 starts to be opened around the axis supporting portions 6a, 7b as pivots (see, FIGS. 15, 17).

After that, by pivot angle restriction protruding portions 18, 20 which were disposed on the document cover 6 and the hinge 7 shown in FIGS. 7, 8, a pivotal movement of the document cover 6 is stopped at the portion that it is opened by nearly 40° to the hinge 7 as shown in FIG. 21.

Even if an operator tries to open the document cover 6 more, the document cover 6 maintains the above-described angle of nearly 40° since a pivotal movement of the document cover 6 is restricted to the hinge 7.

On this account, the document cover 6 and the hinge 7 starts to be opened around the pivoting portion A2 as a pivot (axis) at a lower position of the concave portion 1a of the apparatus main body 1 (see, FIGS. 14, 17).

Further, when the document cover 6 is opened, at the place in which it is opened by nearly 100°, a protrusion 19 at a rear end of the hinge 7 is locked by a protrusion 17 of the apparatus main body 1 as shown in FIG. 22, and at this position, it is possible to maintain the document cover 6 in the posture (condition) that it is opened to the apparatus main body 1.

On this account, an operator can set a document P, loosing a hand from the document cover 6 (see, FIG. 1). Here, the protrusion 19 of the hinge 7 and the protrusion 17 of the apparatus main body 1 configure a restriction portion which relates to the invention.

After that, when the document P is set and the document cover 6 is closed, the document cover 6 and the hinge 7 pivot in an integrated manner around the pivoting portion A2 as a pivot (see, FIGS. 14, 17) until the hinge 7 is completely closed on the apparatus main body 1, by balance of torque and gravity.

After that, this time, only the document cover 6 pivots around the axis supporting portions 6a, 7b as a center. By such opening and closing operations, a document press-contact sheet 8, which is disposed on the document cover 6 on the side of the document table glass 2, is attached firmly to a document, and the document P is properly fixed on the document table glass 2.

During a period of the above-described operation, the convex portion 7a simply pivots on the lower side of the concave portion 1a of the apparatus main body 1, i.e., at a position of the pivoting portion A2, since own weight of the hinge 7 is applied.

(Response to Thick Document)

Next, the case that a thick document D such as a book is set from the condition that an opened posture of the document cover 6 shown in FIG. 10 is maintained at such a position that an opening angle to the apparatus main body 1 is nearly 100° and the document cover 6 is closed will be described.

A closing operation of the document cover 6 and the hinge 7 is carried out, holding the condition that an angle relation at the time that they are opened each other is maintained, until the document cover 6 contacts the thick document D.

After the document cover 6 contacted the thick document D, postures of the document cover 6 and the hinge 7 are decided at the position in which balance is maintained depending on a height of the document D, as shown in FIG. 13.

At this time, it is designed in such a manner that the hinge 7 pivots freely within the range that its opening angle is nearly 0° through nearly 60°, depending on a thickness of the document D, and can press a thick document of approximately 25 mm at the maximum. (180° Open)

As described above, on the occasion of opening the document cover 6, when an angle, which is formed with the hinge 7, exceeds nearly 40°, the hinge 7 also starts to pivot along with the document cover 6.

Figure 16:
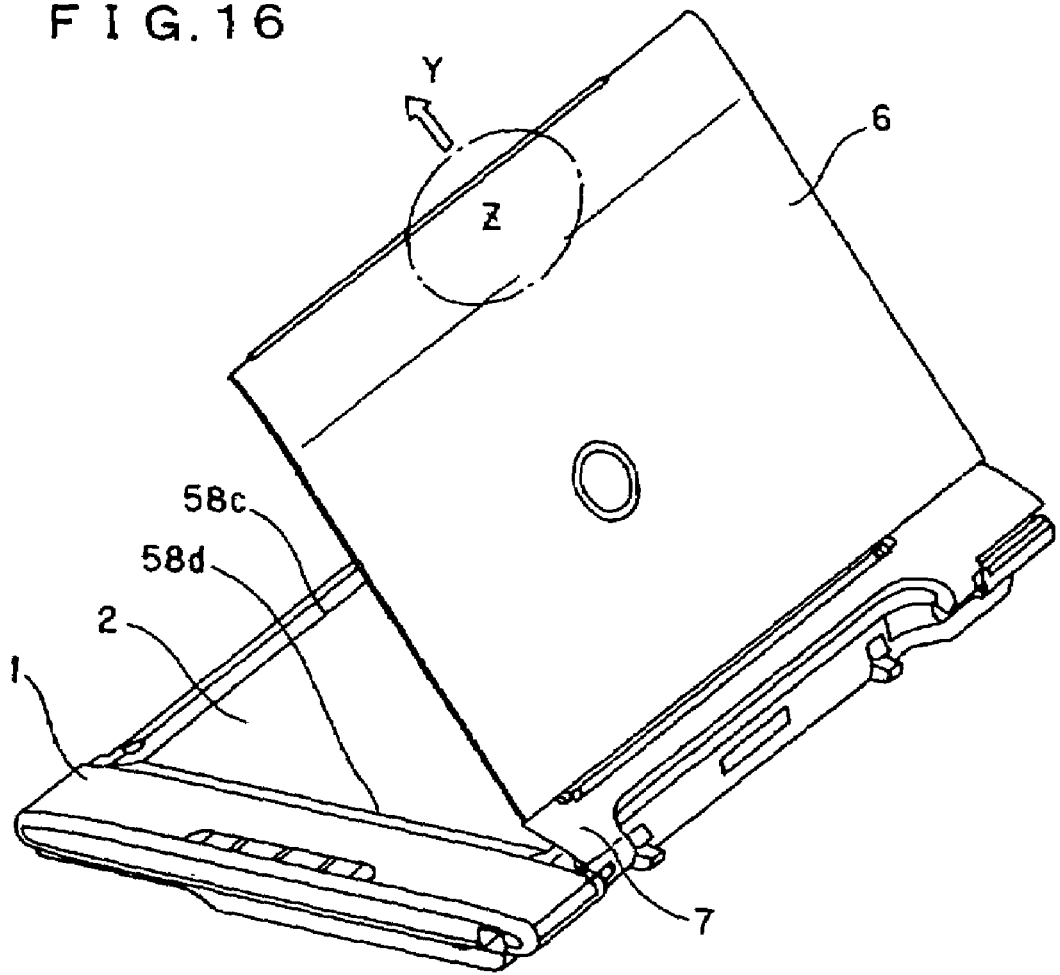

At the position that the cover is opened by nearly 60° (see, FIGS. 16, 18), a front end portion Z of the document cover 6 is lifted up in a direction of an arrow Y as shown in FIG. 16.

Then, along with this, the convex portion 7a at a rear end of the hinge 7 passes through the nearly gourd shaped constricted portion 1b of the concave portion 1a, which was disposed at a rear end portion of the apparatus main body 1, and moves from a lower position (FIG. 18) where the pivoting portion A2 is a fitting portion to an upper position where the pivoting portion A1 is a fitting portion (FIG. 19).

After that, when the document cover 6 pivots more, the convex portion 7a pivots at the pivoting portion A1 at the upper position of the nearly gourd shaped concave portion 1a as a pivot.

At this time, since the protrusion 19 moves to the upper side integrally with the axis 7a, even if it pivots, it is not locked by the protrusion 17 of the apparatus main body 1 (see, FIG. 23), and can pivot to a position of nearly 180° without change, as shown in FIGS. 11, 20.

Meanwhile, it is also all right even if restriction means for stopping the document cover 6 at the position of nearly 180° to the document table glass 2, but it is also all right even if an open position is set up by contacting an installation surface without disposing such restriction means.

This opening way is suitable for scanning of a larger document than the document table such as a map and a magazine, and it becomes possible to scan an arbitrary place of a large document without giving damage to a document.

In addition, on the occasion of closing the document cover 6 from this condition, it pivots around the pivoting portion A1 as a pivot until it is closed up to the condition that an opening angle of the document cover 6 to the apparatus main body 1 becomes nearly 60°.

Then, the convex portion 7a at a rear end of the hinge 7 passes through the constricted portion 1b of the nearly gourd shaped concave portion 1a which is disposed at a rear end portion of the apparatus main body 1, and thereby, it moves from the upper position A1 to the lower position A2.

At this time, it is better to configure in such a manner that the convex portion 7a at a rear end of the hinge 7 passes through the constricted portion 1b of the nearly gourd shaped concave portion 1a by own weights of the document cover 6 and the hinge 7.

After that, when the document cover 6 is closed, the convex portion 7a at a rear end of the hinge 7 pivots around the pivot A2 as a pivoting center at the lower position, and thereby, the document cover 6 comes into the condition that it is completely closed to the apparatus main body 1 as shown in FIG. 9.

By selecting any one of the above-described three opening ways, scanning of every document becomes possible, regardless of a thickness, a size, a type etc. of a document, and it means that operability is improved exponentially.

In addition, a magnet 21 is attached to a front end portion Z of the document cover 6 as shown in FIG. 1, and on the apparatus main body 1 which faces to the magnet 21, a metal member 22, to which the magnet 21 is sucked, is placed.

Meanwhile, an elastic member 8b, which is disposed integrally with the document press-contact sheet 8, has the thickness that it is smashed up to a certain degree, under the condition that the document cover 6 is closed and the magnet 21 is attached firmly to the document table glass 2.

On this account, when a document is placed on the document table glass 2 and the document cover 6 is closed, the document press-contact sheet is attached firmly to the document table glass 2 through the influence of a magnet 23.

At this time, the elastic member 8b of the document press-contact sheet 8 bends, and therefore, its pressure is applied to a document through the document press-contact sheet 8, and even if there are corrugation and curl on a document, they are stretched up, and the document is attached firmly to the document table glass 2.

This application claims priority from Japanese Patent Application No.2004-379299 filed Dec. 28, 2004, which hereby incorporated by reference herein.

What is claimed is:

1. An image reading apparatus for reading out an image of a document, comprising:
    a document table on which the document is placeable;
    a cover member for pressing the document placed on the document table; and
    a hinge supporting the cover member relative to a main body of the image reading apparatus to allow the cover member to open and close to access the document table of the image reading apparatus,
    wherein the hinge has a cover opening limit angle adjustment mechanism that sets up a plurality of upper limits of an opening angle of the cover member relative to the document table,
    wherein the cover opening limit angle adjustment mechanism has at least two pivoting portions that are substantially vertically arranged when the document table is in a horizontal position, and a changeover mechanism that changes an engagement position of the pivoting portions, and
    wherein the opening range angle of the cover member relative to the document table is nearly 180 degrees or more.

2. The image reading apparatus as set forth in claim 1, wherein the hinge has a pivot axis and at least two pairs of bearing sections disposed at the pivoting portions for supporting the pivot axis at one of the pivoting portions, and the changeover mechanism has a communicating path disposed between the bearing sections and configured to allow the pivot axis to move therethrough.

3. The image reading apparatus as set forth in claim 2, wherein the pivot axis has a pivoting section pivotable at the bearing section, and a moving section movable between the bearing sections.

4. The image reading apparatus as set forth in claim 3, wherein the pivoting section is cylindrical and the moving section is shaped with diametrically opposing sections of the cylindrical pivoting section thinned to form two parallel surfaces and a width between the two parallel surfaces is smaller than a width of the communicating path.

5. The image reading apparatus as set forth in claim 1, wherein the cover opening limit angle adjustment mechanism has a restriction section that restricts a pivoting movement of the cover member at a predetermined position, when the cover member pivots at one of the pivoting portions, relative to the image reading apparatus main body.

6. The image reading apparatus as set forth in claim 5, wherein the pivotal movement of the cover member is restricted so that the opening angle range of the cover member relative to the document table becomes nearly 90 degrees through nearly 120 degrees when the cover member pivots at the one of the pivoting portions, and the opening angle range of the cover member relative to the document table becomes nearly 180 degrees or more when the cover member pivots at the other of the pivoting portions.

* * * * *